United States Patent [19]

Black

[11] Patent Number: 4,706,279

[45] Date of Patent: Nov. 10, 1987

[54] ARRANGEMENT FOR INITIALIZING A CENTREX CONSOLE INTERFACE CIRCUIT

[75] Inventor: James B. Black, Phoenix, Ariz.

[73] Assignee: GTE Communication Systems Corporation, Phoenix, Ariz.

[21] Appl. No.: 813,176

[22] Filed: Dec. 24, 1985

[51] Int. Cl.$^4$ .............................................. H04M 3/42
[52] U.S. Cl. .................................. 379/279; 379/267; 379/229
[58] Field of Search ............... 379/260, 261, 262, 263, 379/264, 265, 266, 267, 284, 229, 231, 232, 233, 234, 201, 279

[56] References Cited

U.S. PATENT DOCUMENTS 4,210,782  7/1980  Fujita .................................. 379/269

Primary Examiner—James L. Dwyer
Attorney, Agent, or Firm—Anthony Miologos; Peter Xiahros

[57] ABSTRACT

An arrangement for initializing an interface circuit connected between a CENTREX equipped central office exchange and a remotely located attendant console. The arrangement includes an operating unit residing in the interface circuit. The operating unit includes a controller connected to memory and to the CENTREX. The controller receives an initialization signal from the CENTREX and returns an initialization in progress signal. Memory verification called next by the controller ascertains if all locations in the memory are operable. The controller sends an error signal to the CENTREX in the event the memory verifications detects an error. Next, interface initialization called by the controller resets and clears a sequential memory and resets and clears a send/receive circuit connected to the controller and the attendant console. Transmission verification called next by the controller checks if the transmit and receive loop between the attendant console and the interface circuit is operable. Finally, an attendant console reset is called by the controller which sends a reset data message to the attendant console. In response to a successful reset of the attendant console the controller sends an initialization complete signal to the CENTREX.

10 Claims, 6 Drawing Figures

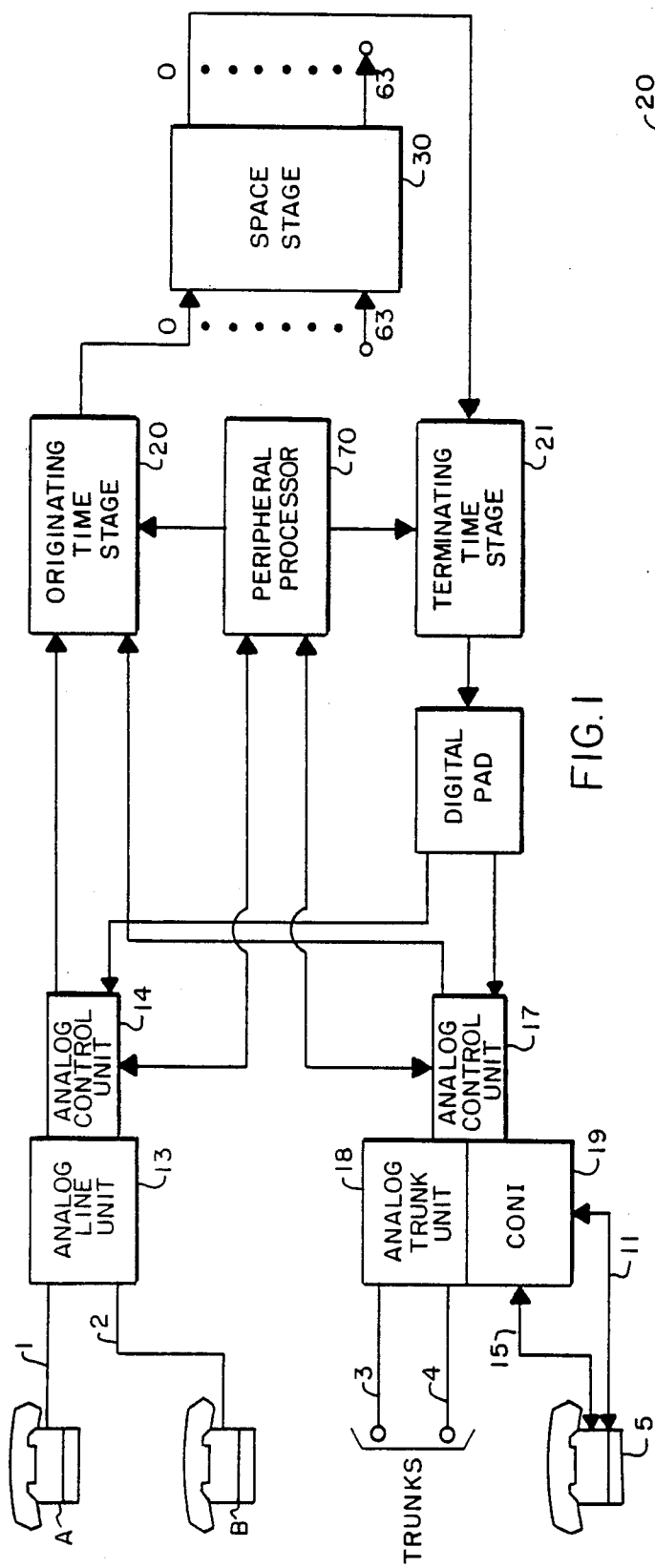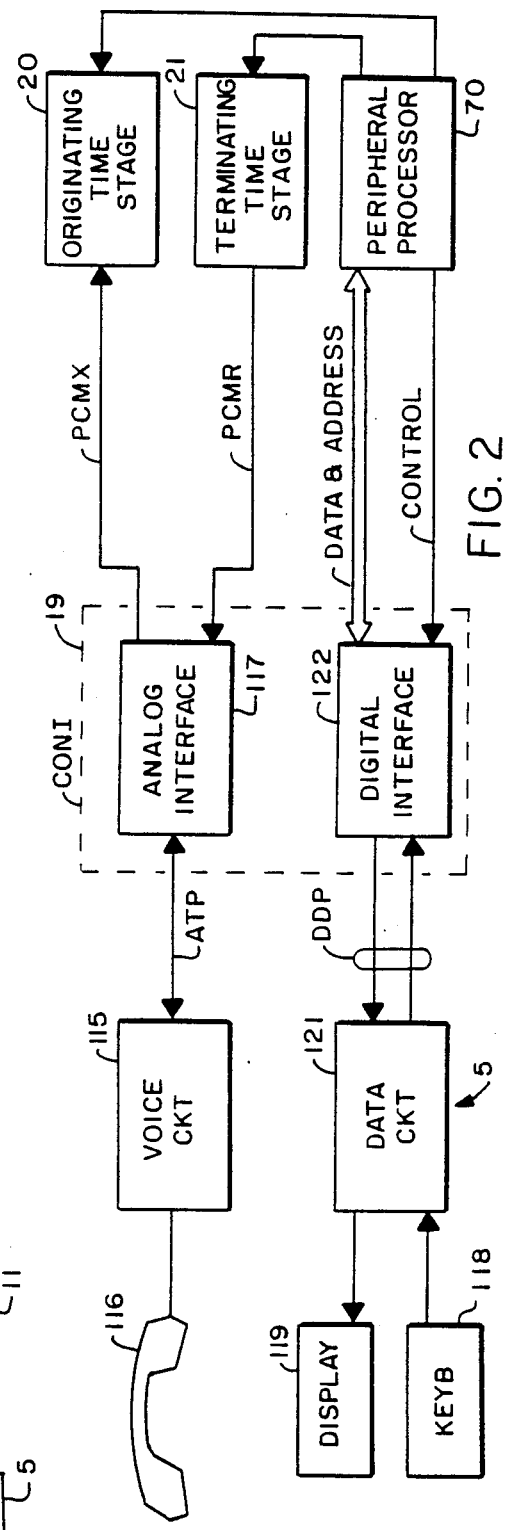

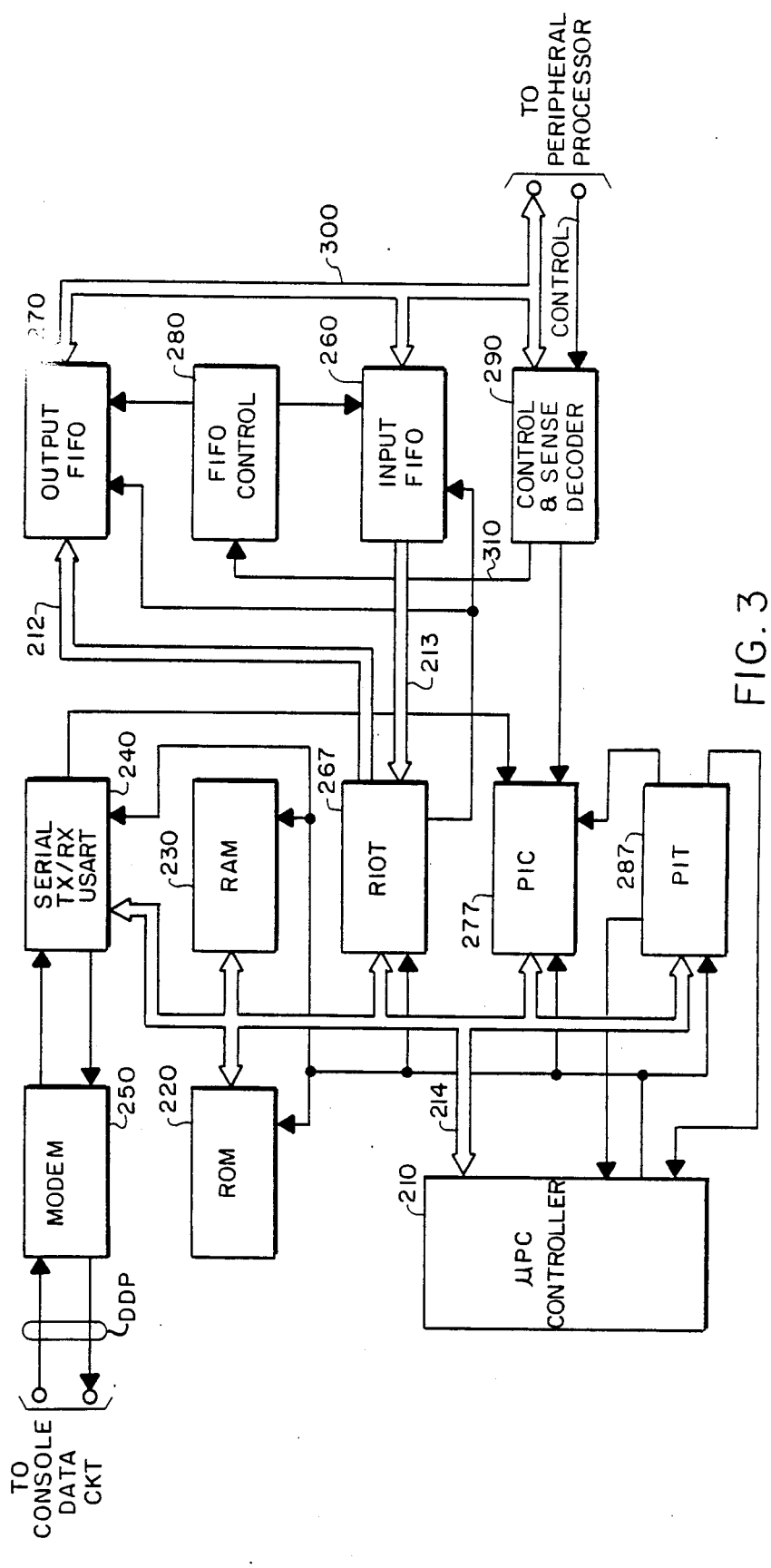
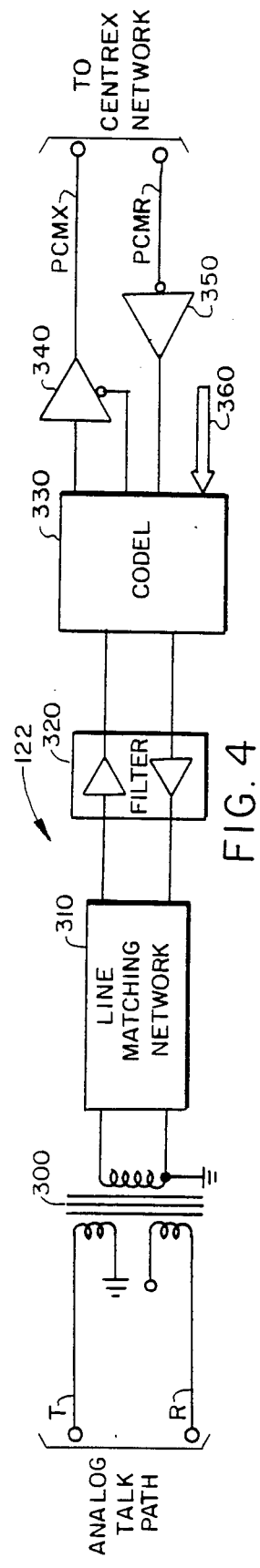
FIG. 3
FIG. 4

ARRANGEMENT FOR INITIALIZING A CENTREX CONSOLE INTERFACE CIRCUIT

CROSS-REFERENCE TO RELATED APPLICATIONS

The present application is related to the following co-pending U.S. patent applications all having the same inventive entity and being assigned to the same assignee:

Ser. No. 813,322, titled, "A CENTREX ATTENDANT CONSOLE INTERFACE;"

Ser. No. 813,188, titled, "AN INTERFACE CIRCUIT FOR TRANSMITTING KEYCODES TO A CENTREX;"

Ser. No. 813,187, titled, "AN INTERFACE CIRCUIT FOR TRANSMITTING COMMAND CODES TO AN ATTENDANT CONSOLE;"

Ser. No. 813,321, titled, "CONTROL CIRCUIT FOR A CENTREX ATTENDANT CONSOLE INTERFACE;"

Ser. No. 813,186, titled, "AN ARRANGEMENT FOR TRANSFERRING DATA TO A CENTREX;"

Ser. No. 813,185, titled, "AN ARRANGEMENT FOR TRANSFERRING DATA TO AN ATTENDANT CONSOLE."

BACKGROUND OF THE INVENTION

The present invention relates in general to telecommunication switching systems and more particularly to an interface linking voice and data communications between a CENTREX equipped central office exchange and an attendant console.

Private Branch Exchanges (PBX) are telecommunication systems which provide communication services to customers having a plurality a subscriber instruments. The PBX equipment provides a host of enhanced features such as call forwarding, intercom functions, least cost routing of calls and detailed billing. Normally the PBX is purchased by the custmoer and installed on premises at his location. Therefore, since the PBX handles a first level of switching among the subscriber instruments fewer central office lines are required and therefore access charges are lower. However, this savings is offset by the initial cost of the PBX equipment.

An alternative to the classical PBX is being offered in the Telecommunication market today which provides all of the features of a PBX without any of the initial costs. This system known in the field as CENTREX (central exchange) allows either a portion of a central office network switching system or a dedicated CENTREX central office network switching system to function and provide the services and features as would a dedicated PBX. The customers subscriber instruments are connected directly to the CO switch or concentrated with a multiplexing device and connected via trunk lines. The telephone operating company providing the service would service the switch therefore, alleviating the customer of maintaining his own equipment. Of course access charges are somewhat higher with the CENTREX than those with the on premises PBX equipment.

Usually PBX equipment includes an attendant console which monitors the PBX, i.e. lines or trunks in use, and provide a means of selecting or deselecting features and services as well as a system status display. Additionally, the console can also serve as a central operator station providing for attendant call handling. Such consoles are also used with CENTREX systems to provide the features discussed above.

It therefore becomes the object of the present invention to provide a console interface circuit to link an attendant console normally located at the customer premises with a CENTREX network system located at a telephone operating companies central office.

SUMMARY OF THE INVENTION

In accomplishing the object of the present invention there is provided an operating unit for initializing an interface circuit connected between a CENTREX equipped central office exchange and an attendant console. The central office exchange includes an analog control unit connected to a peripheral processor. The analog control unit includes a control field for sending control signals to the interface circuit and a sense field for receiving control signals from the interface circuit.

The operating unit of the present invention comprises controller means connected to memory means and to the control and sense fields. The controller means receives an initialization signal from the peripheral processor over the control field and returns an initialization in progress signal to the peripheral processor via the sense field.

Memory verification means called by the controller means is arranged to ascertain if all locations in the memory means is operable. The controller means sends an error signal to the peripheral processor via the sense field if the memory verifications means detects an error.

Next, interface initialization means called by the controller means resets and clears the sequential memory means. The sequential memory means is connected to the controller means and to the analog control unit. The interface initialization means further resets and clears send/receive means connected to the controller means and the attendant console.

Transmission verification means called by the controller means is used to ascertain if the transmit and receive loop between the attendant console and the interface circuit is operable. The controller means sends an error signal to the peripheral processor via the sense field if the transmission verification means detects an error.

Finally, an attendant console reset means is called by the controller means which sends a reset data message to the attendant console via the send/receive means. In response to a successful reset of the attendant console the controller means sends an initialization complete signal via the sense field to the peripheral processor.

A BRIEF DESCRIPTION OF THE DRAWINGS

A better understanding of the invention may be had from the consideration of the following detailed description taken in conjunction with the accompanying drawings in which:

FIG. 1 is block diagram of a CENTREX network system embodying the present invention.

FIG. 2 is block diagram showing the linking paths of the present invention interface the attendant console and the CENTREX network system.

FIG. 3 is a block diagram of the digital line interface.

FIG. 4 is a block diagram of the analog line interface.

DESCRIPTION OF THE PREFERRED EMBODIMENT

Figure 5:
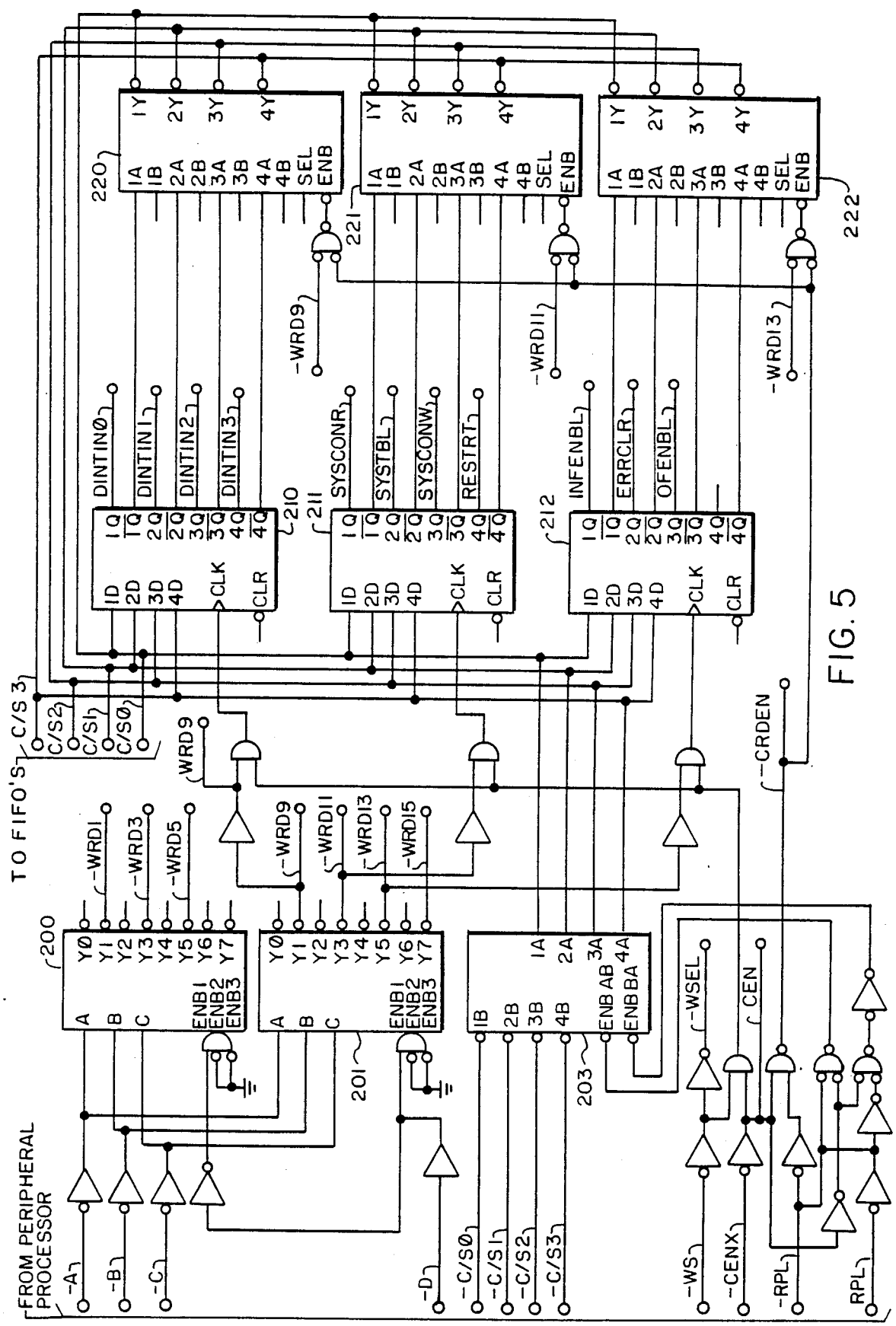
FIG. 5 is schematic of the Control and Sense Decoder shown at FIG. 3.

Referring to FIG. 1, a time-space-time digital switching system having a central exchange or CENTREX feature is shown. As a standard central office exchange telephone instruments A and B are connected to the network switching system via analog subscriber lines 1 and 2 to an analog line unit 13. The analog data received is converted to Pulse Code Modulated (PCM) digital signals for output to the next network stage. Analog line unit 13 is connected to analog control unit 14. Originating time switch 20 is connected to a space switch unit 30, which in turn is connected to a terminating time switch 21. Terminating time switch 21 is connected to analog control unit 14 and finally back to analog line unit 13 where the PCM digital signals are converted to analog signals and transmitted down subscriber lines 1 and 2.

Terminating time switch 20 is further connected to analog control unit 17, analog trunk unit 18 and trunks 3 and 4. Analog trunk unit 18 can be dedicated exclusively for CENTREX use. The trunk unit 18 connects the CENTREX customers subscriber instruments to the network system.

The Console Interface Circuit (CONI) 19 of the present invention is connected to a duplex pair of an analog control unit 17 and provides the means by which system commands, display messages and attendant console keycodes are transferred between the attendant console 5 and the CENTREX network system. The operation of the CONI circuit is transparent to both the system and the attendant console. Communication between CONI 19 and console 5 is via a digital data path 15 and an analog talk path 11.

Turning now to FIG. 2, a block diagram illustrating the interface of the attendant console to the CENTREX system is shown. The CONI interfaces the attendant console 5 and CENTREX system via two distinct communication links. In the first link, all analog signals are interfaced from the console handset 116, via voice transmission circuit 116 and analog talk path (ATP) to the analog interface 117 in the CONI 19. The analog signals are converted in the analog interface 117 into pulse code modulated (PCM) signals and transmitted to the originating time stage 20 of the CENTREX network via PCM path PCMX.

Likewise, analog information destined for the attendant console 5, is applied in PCM form to PCM path PCMX from the terminating time stage 21. The PCM information is converted into analog information by the analog interface 117 of CONI 19 and sent to handset 116 through the ATP and voice circuit 115. This communication link forms the talking path between the console 5, the CONI 19 and the network system of the CENTREX.

The data link between the console 5 and the CONI 19 is routed from a keyboard via a console data circuit 121 and a 4 wire full duplex data link (DDL) to the digital interface 122. Data input by the console operator is converted by the data circuit 121 into asynchronous data messages comprising 1 start bit, 7 data bits, an even parity bit and a stop bit. The data messages are transmitted over the DDL via a 1200 baud Frequency Shift Key (FSK) modem located in data circuit 121. The data transmitted by the console is received by the CONI 19 digital interface 122, converted into 8-bit data bytes and is processed by the CONI. The data is passed on to the network via ACU 17 to the peripheral processor 70 if no action is required by the CONI. The CONI thereby assumes a "transparent" front to the CENTREX network system and functions as a transaction exchange medium. Alternatively, in certain cases keycodes and command codes received by the CONI are acted upon and responded to by the CONI.

Data from the peripheral processor 70 in the form of command codes is transmitted to the CONI digital interface 122. Again if the data is destined only for the console the CONI formats the data into FSK asynchronous data messages and transmits the messages over the 1200 baud DDL to the console data circuit 5. The data is interpreted by the console and the appropriate display device 119 activated, i.e. LEDs turn on or off, a message displayed, the display cleared, or an audible alarm turned on or off.

Turning now to FIG. 3, a detailed explanation of the CONI digital interface will be given.

The CONI interface of the present invention is comprised of the following Large Scale Integrated (LSI) devices. A controller portion includes a microprocessor 210 connected to a Read Only Memory (ROM) 220 and Random Access Memory (RAM) 230 through an address/data bus 214. The ROM circuit 220 stores the operating system used by the microprocessor 210 which controls the operation of the CONI interface. The RAM is used as a temporary storage area for the message bytes received by the CONI.

The controller portion further includes a RAM I/O Timer circuit (RIOT) 267 such as the INTEL 8155. The RIOT interfaces the controller bus 214 with the input and output FIFO's 260 and 270 respectively. The timer on board the RIOT is used to develop signal TIMER0. A second Programmable Interface Timer (PIT) 287 such as the INTEL 8253 is used to generate 3 more timer signals TIMER1, TIMER2 and TIMER3 used by the CONI for various interrupt handling routines. Finally, a Programmable Interrupt Controller (PIC) 277 such as the INTEL 8259A is used to provide the CONI circuit with eight levels of interrupts. The interrupt levels are as follows:

TRAP—is the highest priority. It is a non-maskable interrupt input which is generated by the output of TIMER1 at regular intervals. Its purpose is to provide for limited method of sanity checking for the CONI's operation.

IR0—The receive ready interrupt used to signal the availability of received data at the USART 250.

IR1—the transmit ready interrupt used to signal that the USART 250 is ready to accept another data byte for transmission.

IR2—SYSCONR control signal from the peripheral processor indicating that the peripheral processor is reading data from the output FIFO 270.

IR3—SYCONW control signal from the peripheral processor indicating that it has placed a message in the input FIFO 260 and is available for the CONI.

IR4—SYSTBL control signal from the peripheral processor indicating that the peripheral processor has detected an error in a message being ready and the CONI should retransmit to the peripheral processor.

IR5—TIMER3 signal from the PIT 287 indicating that the console failed to send either an ACKNOWL- EDGE or a NO-ACKNOWLEDGE message in response to a message sent by the CONI.

IR6—TIMER2 signal indicating the incoming message from the console 5 was to long.

IR7—ERRCLR control signal from the peripheral processor indicating that the peripheral processor has read the error code sent by the CONI and the CONI should clear the error field.

This controller portion of the CONI interface is connected to the console 5 via a serial Transmitter/Receiver (Tx/Rx) 240 and a Frequency Shift Key (FSK) modem chip 250.

The serial Tx/Rx is a LSI Universal Serial Asynchronous Receiver Transmitter (USART) such as the Intel 8259. This device under control of the microprocessor translates the 8 data bits sent to the USART on the address/data bus into the asynchronous serial data words described earlier. The FSK modem translates the data into audio tones for the transmission of the data down a twisted pair transmission path.

The connection between the CONI interface and the peripheral processor is accomplished via a pair of 64×4 First In First Out (FIFO) circuits. An input FIFO 260 and an output FIFO 270 each have one side of the FIFOs connected to address/data bus 300 which extends from the peripheral processor. Each FIFO is further connected to the CONI data bus 213. A control and sense decoder 290 is also connected to the peripheral processor address/data bus 300 and CONI address/data bus 213. The control and sense decoder interprets control words sent by the peripheral processor detailing the type of messages sent to the CONI and any special handling required. The control and sense decoder 290 also communicates to the microprocessor and a FIFO control circuit 280 via control lead 310.

As explained earlier and shown on FIG. 2 the CONI also includes an audio interface for transmitting analog voice signals between the console 5 and CENTREX network system and CENTREX network system to the console 5. The analog interface between the console 5 and the CONI consists of a single tip and ring voice pair (T and R). On this analog pair voice conversations and DTMF tones are transmitted. The system provides the talk battery on the tip and ring leads which also powers the DTMF generator in the console. The console 5 contains a standard network interface.

Turning now to FIG. 4, the analog interface of the CONI is illustrated. The interface 122 includes a two to four wire hybrid coil 300, a line matching network 310 in the form of an electrical hybrid, a transmit and receive amplifier and filter comprised of an INTEL 2912 filter and an INTEL 2910 CODEC (COder/DECoder). The hybrid coil 300 interfaces directly to the line matching network 310. The line matching network includes the necessary components for two balancing networks. This allows the use of −5 volt non-loaded lines or +12 volt loaded lines. The line matching network 310 is connected via lines TX and RX to filter network 320. The TX line connects to a transmit filter in the filter 320 as does the RX line to a receive filter. The filters also have provisions for adding the necessary gain in both the transmit and receive paths. The filter 320 is further connected via lines TX and RX to the CODEC 2910. The output of the transmit filter drives the analog input of CODEC 330. The CODECs primary function is to encode an analog signal into a 8 bit PCM word which is then sent to the network in the proper channel via driver 340 and the PCM transmit bus PCMX.

Similarly, the CODEC 330 will clock in information from the receive PCM bus PCMR and driver 350 during its assigned channel. The binary signal is then decoded into PAM (pulse amplitude modulated) signals by the CODEC and converted into an analog signal by the receive filter of filter 320. The analog signal is then applied to the console via the line matching network and the T and R leads of the hybrid coil 300. Controls signals 360 connected to the peripheral processor allows the CODEC to be programmed to operate in a specific manner i.e. transmit and receive, transmit only or operate within a specific time slot.

It should be noted since the CONI analog interface and digital interface use two distinct communication links to transmit information between the console 5 and the CENTREX network system the analog talk path and the duplex data path may be used simultaneously in transmission and reception of analog and digital data.

Before a detailed explanation of the CONI circuit is given it is believed an understanding of the message structure transmitted between the console and the CENTREX system will be helpful. The messages that are transmitted between the CONI console 5 and the CENTREX system are in an ASCII field format. All characters including numbers are transmitted as ASCII characters. The field format consists of command and data fields strung together to form a command string. This command string is treated as a single message by the console 5 or the CENTREX system. Command and data fields are separated by a "CARRIAGE RETURN" (CR). A message is terminated by a null field which is in this case a double "CARRIAGE RETURN". There is no set field length, but the maximum message length is 64 characters. Each message from the system is followed by a complementary checksum. A checksum is sent with each keycode message transmitted by console 5 or each command code transmitted by the CENTREX. The following are examples of valid command strings:

A 3 field command sent from the system to the console.
  XX:MM:DDDDDDDD::C

A 2 field response sent from the console to the system.
  XX:DDDDDDDD::C

In the above examples:
  X=command code or keycode.
  M=command code modifier.
  D=command code data.
  C=checksum
  :="CARRIAGE RETURN" field delimiter.

All command codes, keycodes, modifiers and data are in a 7 bit ASCII format. The checksum is a 2's complement of the entire command message including the carriage return field delimiters.

Normally the data messages will carry keycodes to the CENTREX system from the console 5 or command codes from the CENTREX system to the console 5.

The CONI interface circuit communicates to the console 5 and to the CENTREX network system by accepting information from one end and transferring that information to the other. In order for this to be accomplished in the most expedient manner, the CONI uses priority structure to decide which action to take. The priority is as follows:

PRIORITY 1    highest    console incoming data to CONI

| | | |
|---|---|---|
| PRIORITY 2 | | console outgoing data from CONI |
| PRIORITY 3 | | CONI data from the network |
| PRIORITY 4 | lowest | CONI data to the network |

Turning now to FIG. 5, a detailed schematic of the control and sense decoder 290 is shown.

The control and sense decoder interfaces the CONI and CENTREX peripheral processor. The circuit is comprised of control point decoders 200 and 201, data transceiver 203, flip-flops 210-212 and data selectors 220-222. In addition, a number of logic gates are used to provide decoding of various read, write and enable control signals.

Decoders 201 and 202 have their inputs connected to the analog control unit (ACU) 17 which is connected to the peripheral processor 70. In all cases the CONI communicates to the peripheral processor 70 via a control and sense field of ACU 17. Decoder inputs −A−−D are address leads which specify a control point or sense point type. For example, a binary "1" (0001) sent to decoders 201 and 202 is interpreted as a WORD 1 control point, setting the decoder 200 output lead labeled −WRD1. As can be seen there are 7 output control words and therefore decoders 200, 201 recognize 7 control points. The control words will be identified later in the explanation of the operation of the CONI. The ACU 17 is further connected to the control sense decoder 290 via a bidirectional data control and sense bus C/SO-C/S3. Message data as well as other control data such as ERROR words are passed between the CONI and the peripheral processor via this bidirectional bus. Finally, write control signals, −WS, −WSEL, read control signals −RPL, RPL and enabling signals −CENX, CEN are input from ACU 17 and decoded and used to write, read and enable the control words and data being transferred between the CONI and the peripheral processor 70.

Figure 6:
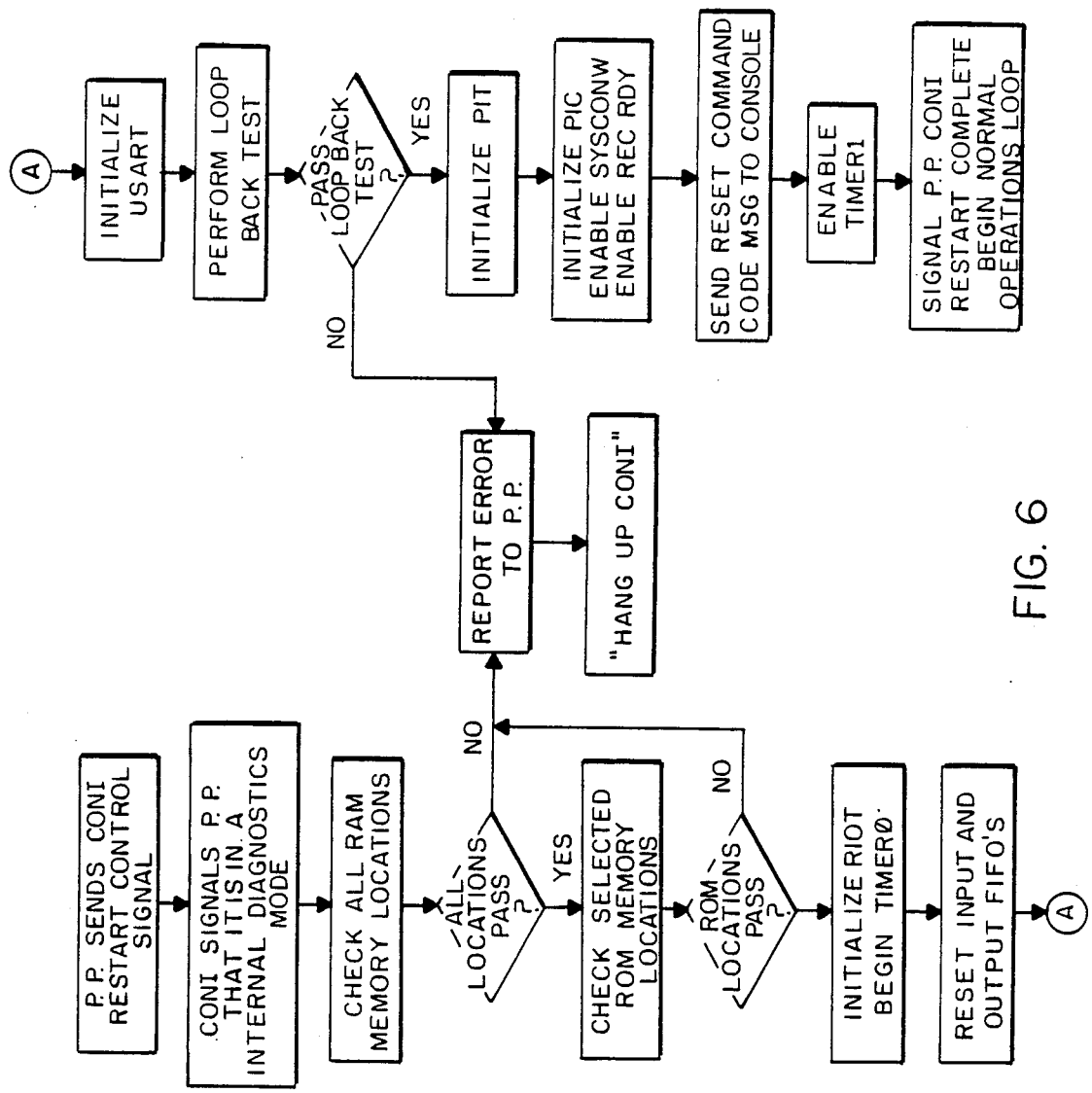
FIG. 6 is a flow chart diagram illustrating the initialization operation of the CENTREX console interface circuit of the present invention.

Turning now to FIG. 6 of the included drawings the operating unit for initializing the CONI will now be explained.

This operating unit is entered by the application of the control point RESTRT which at flip-flop 211 in FIG. 5. An ERROR code of HEX "F" is set indicating to the peripheral processor that the CONI is in its internal diagnostics. A check of the RAM memory is performed next and all RAM locations are checked that they contain the values of 55, AA and OO. If any memory location does not compare than an error code is sent to the peripheral processor which will "hang up the CONI".

A second memory checking routine is called to check the ROM memory 220. This check involves a block summation of the ROM 220 memory contents between specific addresses, ignoring any overflows and comparing the results with a value stored in a different area of the ROM 220 memory. If there is no comparison than an ERROR code is sent to the peripheral processor which will "hang up the CONI". After the above checks have been completed than the subunit INIT is called which in turn calls the various initialization routines.

The RIOT 267 is initialized by setting one of its three I/O ports as an input and the other two as outputs. The RIOT timer TIMERO is also started which is used as the baud rate generator for USART 240.

The CONI than resets via the microprocessors 210 RST signal the input and output FIFO's 260, 270 respectively.

The USART is initialized next to 16X the clocking and for 7 bit, even parity and 1 stop bit operation.

A data loop back test is next performed by causing the FSK MODEM 250 output to be sent to its input. A single byte is sent to the USART 240 and is read back and compared. If it does not compare or if there is no data available after approximately 100 milliseconds (TIMER2) an error code is continuously sent to the peripheral processor which "hangs up the CONI".

The PIT 287 three timers are initialized next and as well as the PIC 277 with IRO (receive ready) and IR3 (SYSCONW) of PIC 277, being enabled for initial operation.

The CONI than formats and sends to the attendant console 5 a command code reset message. The reset message is in ASCII bytes 33 32 OD OD O1 (HEX) command code of 32 followed by two carriage returns and a checksum of 01. At this point TIMER1 is enabled starting the Timers operation. The CONI than begins its normal main operations loop by sending an error code "0" to the peripheral processor.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An operating unit for initializing an interface circuit connected between a CENTREX equipped central office exchange and an attendant console, the central office exchange including an analog control unit connected to a peripheral processor, said analog control unit including a control field for sending control signals to said interface circuit, and a sense field for receiving control signals from said interface circuit, said operating unit comprising:

controller means connected to memory means and to said control and sense fields said controller means arranged to receive an initialization signal from said peripheral processor over said control field and return an initialization in progress signal to said peripheral processor via said sense field;

memory verification means called by said controller means said memory verification means arranged to ascertain if all locations in said memory means is operable, said controller means arranged to send an error signal to said peripheral processor via said sense field if said memory verifications means detects an error;

interface initialization means called by said controller means, said interface initialization means resetting and clearing a sequential memory means, said sequential memory means connected to said controller means and to said analog control unit, said interface initialization means further resetting and clearing send/receive means connected to said controller means and said attendant console;

transmission verification means called by said controller means, said transmission verification means arranged to ascertain if the transmit and receive loop between said attendant console and said interface circuit is operable, and said controller means arranged to send an error signal to said peripheral processor via said sense field if said transmission verification means detects an error; and attendant console reset means called by said controller means arranged to send a reset data message to said attendant console via said send/receive means whereby, responsive to a successful reset of said attendant console said controller means sends an initialization complete signal via said sense field to said peripheral processor.

2. The operating unit for initializing an interface circuit as claimed in claim 1, wherein: said controller means is a microprocessor controller and said memory means comprises a Random Access Memory (RAM) and said memory verification means test each addressable memory location of said RAM memory.

3. The operating unit for initializing an interface circuit as claimed in claim 2, wherein: said memory means also comprises Read Only Memory (ROM) and said memory verification means tests selected addressable memory location of said ROM memory.

4. The operating unit for initializing an interface circuit as claimed in claim 1, wherein: said interface further includes a Programmable Interface Timer (PIT) circuit having a plurality of resettable timers, said PIT connected to said controller means and said interface initialization means further arranged to initialize and reset all of said PIT's timers after initializing said send-/receive means.

5. The operating unit for initializing an interface circuit as claimed in claim 4, wherein: said interface further includes a Programmable Interrupt Controller (PIC) circuit connected to said controller means and said peripheral processor, and said interface initialization means is further arranged to initialize and reset said PIT after initializing said PIT.

6. The operating unit for initializing an interface circuit as claimed in claim 1, wherein: said sequential memory means comprises a pair of First In First Out (FIFO) circuits.

7. The operating unit for initializing an interface circuit as claimed in claim 1, wherein: said send/receive means comprises a Universal Serial Asynchronous Receiver Transmitter (USART) circuit and a Frequency Shift Key (FSK) modem circuit and transmission verification means includes connecting said FSK modem inputs to its outputs and sending a single data byte out of said USART to said FSK modem and back to said USART, said controller means reads said USART and compares said received data byte with said transmitted data byte and said controller means sends said error message to said peripheral processor if said received data byte and said transmitted data byte do not compare.

8. The operating unit for initializing an interface circuit as claimed in claim 7, wherein: said transmission verification means activates said PIT, and one of said PIT's timers times the transmission of said data byte, and said error signal is sent to said peripheral processor responsive to said USART not receiving said data byte 100 milliseconds after transmission.

9. The operating unit for initializing an interface circuit as claimed in claim 1, wherein: said initialization complete signal sent by said controller means to said peripheral processor is an error signal having the value "0".

10. The operating unit for initializing an interface circuit as claimed in claim 1, wherein: said error signal sent by said controller means to said peripheral processor when an error is detected by said memory verification means and said transmission verification means renders said interface circuit non-operational.

* * * * *